(12) United States Patent
Savchenkov et al.

(10) Patent No.: US 7,729,047 B1
(45) Date of Patent: Jun. 1, 2010

(54) METHOD OF SHIFTING AND FIXING OPTICAL FREQUENCY OF AN OPTICAL RESONATOR, AND OPTICAL RESONATOR MADE BY SAME

(75) Inventors: Anatoliy A. Savchenkov, Glendale, CA (US); Dmitry V. Strekalov, Arcadia, CA (US); Lute Maleki, Pasadena, CA (US); Andrey B. Matsko, Pasadena, CA (US); Vladimir S. Iltchenko, Arcadia, CA (US); Jan M. Martin, Altadena, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 465 days.

(21) Appl. No.: 11/855,380

(22) Filed: Sep. 14, 2007

(51) Int. Cl.
*H01S 3/00* (2006.01)
(52) U.S. Cl. .................... 359/346; 356/480
(58) Field of Classification Search ............ 356/480, 356/454, 481, 517; 359/346
See application file for complete search history.

(56) References Cited

U.S. PATENT DOCUMENTS

| | | | | |
|---|---|---|---|---|
| 2002/0172457 | A1* | 11/2002 | Tapalian et al. | 385/30 |
| 2007/0071386 | A1* | 3/2007 | Digonnet et al. | 385/32 |
| 2007/0114477 | A1* | 5/2007 | Teraoka et al. | 250/580 |

* cited by examiner

*Primary Examiner*—Mark Hellner
(74) *Attorney, Agent, or Firm*—Mark Homer

(57) ABSTRACT

A method of shifting and fixing an optical frequency of an optical resonator to a desired optical frequency, and an optical resonator made by such a method are provided. The method includes providing an optical resonator having a surface and a refractive index, and obtaining a coating composition having a predetermined concentration of a substance and having a refractive index that is substantially similar to the refractive index of the optical resonator. The coating composition inherently possesses a thickness when it is applied as a coating. The method further includes determining a coating ratio for the surface of the optical resonator and applying the coating composition onto a portion of the surface of the optical resonator based upon the determined coating ratio.

15 Claims, 6 Drawing Sheets

US 7,729,047 B1

METHOD OF SHIFTING AND FIXING OPTICAL FREQUENCY OF AN OPTICAL RESONATOR, AND OPTICAL RESONATOR MADE BY SAME

STATEMENT AS TO FEDERALLY-SPONSORED RESEARCH

The invention described herein was made in the performance of work under a NASA contract, and is subject to the provisions of Public Law 96-517 (U.S.C. 202), in which the Contractor has not elected to retain title.

FIELD OF THE INVENTION

The present teachings relate to a method of fixing an optical frequency of an optical resonator to a desired value and to an optical resonator made by such a method. In particular, the present teachings relate to a method which permanently fixes the optical frequency of an optical resonator by the application of a coating to at least a portion of a surface of the optical resonator. The method can be applied to optical resonators used as photonic filters that can be implemented in radar applications.

BACKGROUND OF THE INVENTION

The ability to precisely control the optical frequency of an optical resonator (e.g. a high-Q dielectric whispering gallery resonator) is what determines their value as a photonic component. There is a well-developed technique for permanently fixing the eigen-frequency of an optical resonator by completely coating the surface of the optical resonator with a fine-tuned thickness but this technique requires extremely-precise manufacturing processes. There is also a known technique which temporarily shifts the optical frequency of an optical resonator by the application of a high-voltage to the optical resonator. This technique allows the optical frequency to be temporarily shifted with high-precision but random voltage deviations can undesirably shift the eigen-frequencies of the optical resonator which thereby introduces unwanted noises into the optical resonator.

Accordingly, there exists a need to precisely and permanently fix the optical frequency of one or more optical resonators to a desired value without the need for highly precise manufacturing techniques.

SUMMARY OF THE INVENTION

The present teachings disclose a method of shifting and fixing an optical frequency of an optical resonator to a desired optical frequency, and to an optical resonator made by such a method.

According to the present teachings, a method includes providing an optical resonator having a surface and a refractive index, determining the desired optical frequency, and obtaining a coating composition having a predetermined concentration of a substance and having a refractive index that is substantially similar to the refractive index of the optical resonator. The coating composition inherently possesses a thickness when applied as a coating. The method further includes determining a coating ratio for the surface of the optical resonator and applying the coating composition onto a portion of the surface of the optical resonator based upon the determined coating ratio.

The present teachings also describe a method including providing an optical resonator having a surface and a refractive index, determining the desired optical frequency, and obtaining a coating composition having a predetermined concentration of a substance and a refractive index that is substantially similar to the refractive index of the optical resonator. The coating composition inherently possesses a thickness when applied as a coating. The method further includes applying a coating of the coating composition onto a predetermined coating surface area of the optical resonator, measuring the optical frequency of the optical resonator, and comparing the optical frequency to the desired optical frequency and re-applying a number of additional coatings to the predetermined coating surface area until the desired optical frequency is achieved.

Additionally, the present teachings describe a coated optical resonator having a desired fixed optical frequency. The optical resonator has a surface and a refractive index. A coating is applied on a portion of the surface of the optical resonator whereby the coating includes a coating composition having a predetermined concentration of a substance and having a refractive index that is substantially similar to the refractive index of the optical resonator. The portion of the surface of the optical resonator coated by the coating composition is dependent upon the desired optical frequency and the coating composition.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

It is to be understood that both the foregoing general description and the following detailed description are exemplary and explanatory only, and are intended to provide an explanation of various embodiments of the present teachings.

DETAILED DESCRIPTION OF THE PREFERRED EMBODIMENTS

The present teachings are directed to a method of shifting and fixing an optical frequency of an optical resonator to a desired value by the application of a coating composition to a portion of the optical resonator. The coating composition is chosen to have a refractive index which is substantially similar to the refractive index of the optical resonator. By applying the coating composition to a percentage of the surface area of the optical resonator, the optical frequency (or eigen-frequency) of the optical resonator can be shifted and permanently fixed to a desired value. The coating acts to permanently distort an evanescent field formed in the optical resonator which results in a permanent shift of the eigenfrequency of the optical resonator.

Figure 1:
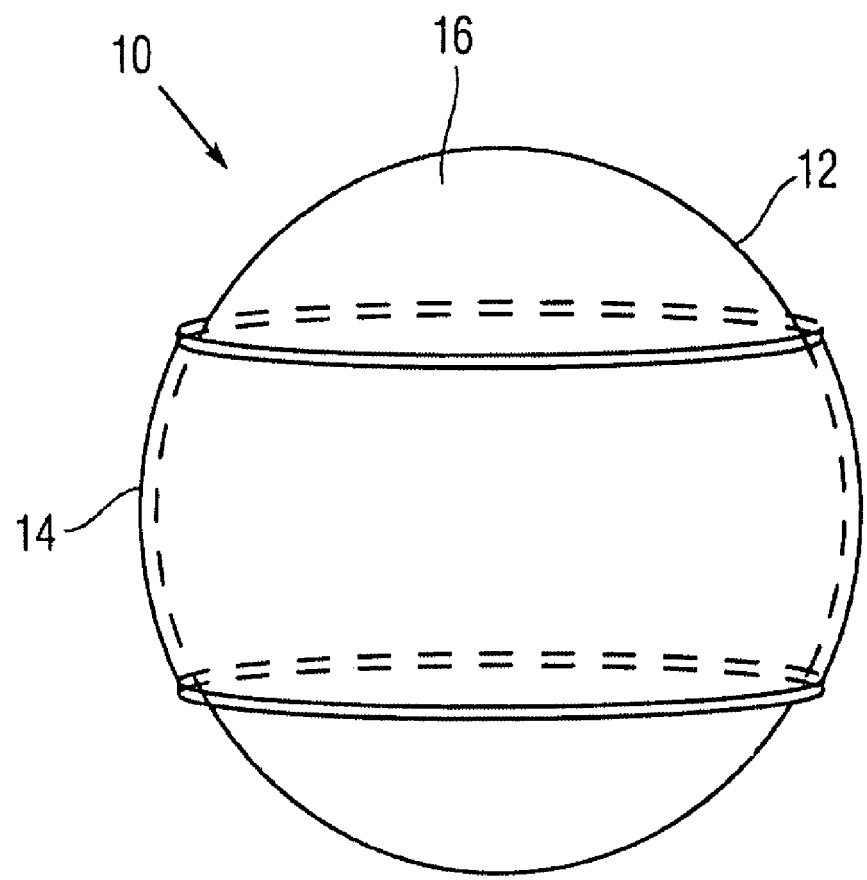
FIG. 1 shows a partially coated optical resonator made by the method of the present teachings.

A partially coated optical resonator 10 which has been coated utilizing the method of the present teachings is shown in FIG. 1. The partially coated optical resonator 10 includes an optical resonator 12 and a coating 14 applied to a portion of the surface 16 of the optical resonator 12. The application of the coating 14 acts to permanently change or shift the optical frequency to a desired fixed value which is different from a non-coated optical frequency of the optical resonator 12.

Figure 2:
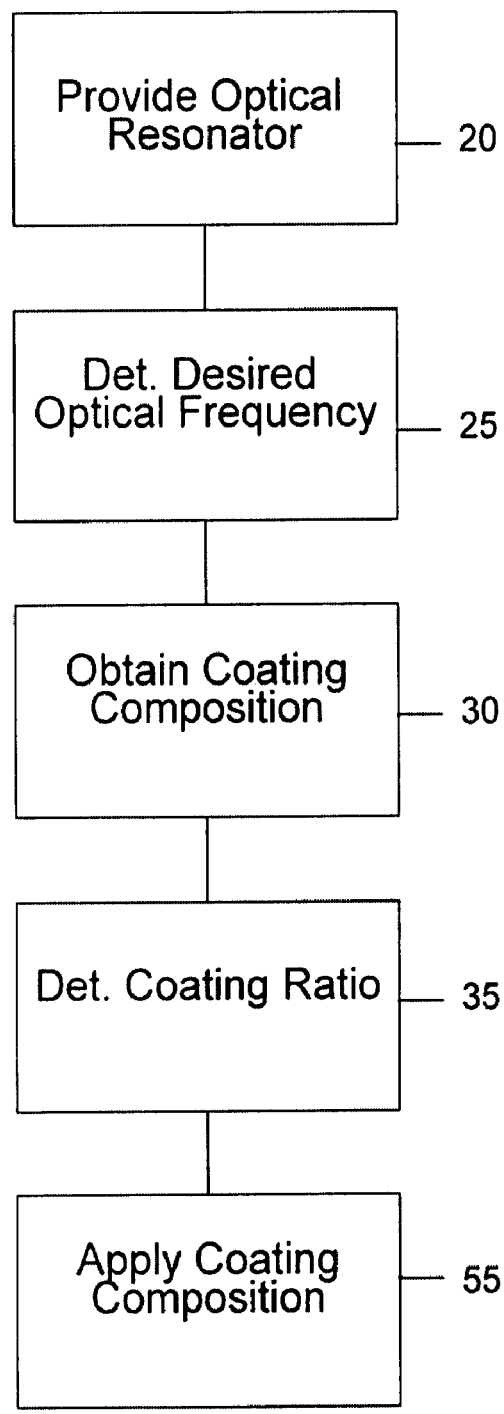
FIG. 2 is a flow diagram of an embodiment of the method of the present teachings.

A flow chart showing an embodiment of a method of the present teachings is shown in FIG. 2. Initially, at step 20 the method includes providing an optical resonator having a surface and a refractive index. At step 25, a desired optical frequency for the optical resonator is determined. At step 30, a coating composition is chosen or obtained having a predetermined concentration of a substance and having a refractive index that is substantially similar to the refractive index of the optical resonator. At step 35, a coating ratio for the surface of the optical resonator is determined. At step 55, the coating composition is applied to the portion of the surface of the optical resonator based upon the determined coating ratio.

The optical resonator 12 used in the method and device of the present teachings can be any whispering gallery mode (WGM) dielectric optical resonator 12, such as a fluorite-based optical resonator (e.g. a calcium fluoride WGM optical resonator) or a lithium niobate WGM optical resonator. The WGM optical resonator can have any shape configuration. For example, the WGM optical resonator can be in a shape of a sphere or a cylinder.

The desired value of the optical frequency that the optical resonator 12 is to be permanently shifted to is determined at step 25. As will be discussed below, the difference between the initial optical frequency of the optical resonator 12 and the desired optical frequency of the optical resonator 12 is referred to as the desired optical frequency shift, FX.

The coating composition chosen at step 30 can be any composition having a refractive index value which is the same or substantially similar to the refractive index value of the optical resonator 12. For example, the coating composition can be a solution having a concentration of a substance, such as a polymer. Each coating composition will inherently possess a thickness when it is applied onto the surface of the optical resonator. Accordingly, the choice of coating composition dictates the coating thickness, which is related to the concentration of the substance (e.g. the polymer) in the composition. Since the concentration of a polymer in the composition is known based on the choice of the coating composition in step 30, one of ordinary skill in the art would know the coating thickness based on the particular coating composition. For example, a table could be used to look up the coating thickness based on the chosen coating composition.

The coating ratio determined at step 35 relates to a percentage of the surface of the optical resonator that is to be coated with the coating composition. The details of determining this coating ratio is further described with reference to FIG. 3.

Figure 3:
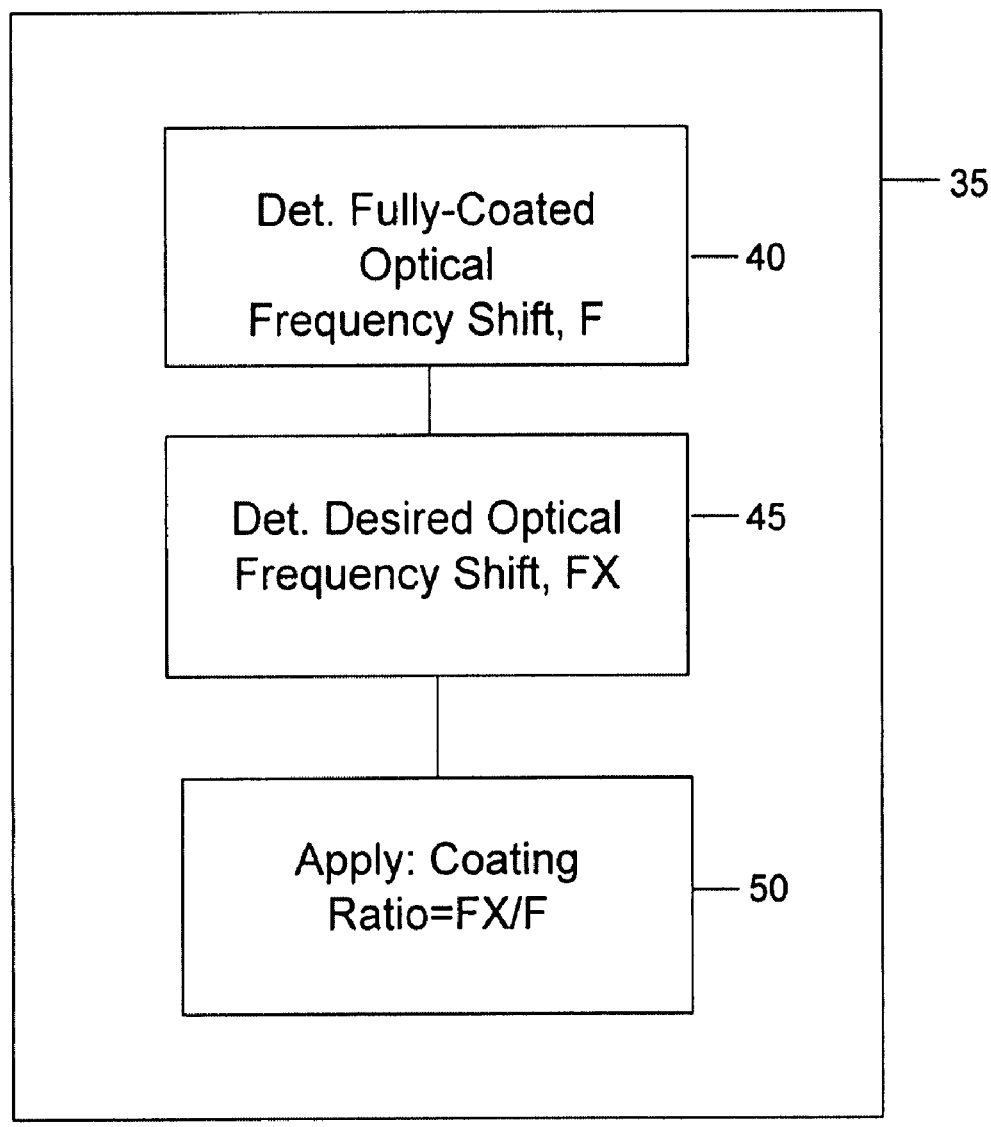
FIG. 3 is a flow diagram showing details of step 35 of the embodiment of the method shown in FIG. 2.

In FIG. 3, step 35 encompasses sub-steps 40, 45, and 50. Sub-step 40 includes determining a fully-coated optical frequency shift, F. The fully-coated optical frequency shift, F, corresponds to the difference between the initial optical frequency of the optical resonator 12 and an optical frequency when the entire surface 16 of the optical resonator 12 is hypothetically fully-coated with the coating composition chosen in step 30. The value of the fully-coated optical frequency shift, F, can be measured by any method as would be known to one of ordinary skill in the art.

Upon determining the fully-coated optical frequency shift, F, further sub-step 45 includes determining the desired optical frequency shift, FX. As stated above, the desired optical frequency shift, FX, corresponds to the difference between the initial optical frequency of the optical resonator 12 and the desired optical frequency of the optical resonator 12.

At sub-step 50, the coating ratio is determined. The coating ratio corresponds to a fraction of the entire surface area of the optical resonator to be coated. The fully-coated optical frequency shift, F, and the desired optical frequency shift, FX, are used to determine the coating ratio using the following equation:

$$\text{coating ratio} = (N/TSA) = FX/F$$

wherein N is the coating surface area (or surface area to be coated) and TSA is the total surface area of the optical resonator which can be determined by any method as would be known to one of ordinary skill in the art.

Knowing the coating ratio, a percentage of the surface area of the optical resonator to be covered with the coating composition can be readily determined by the following equation:

$$(\text{coating ratio}) * 100$$

Now referring back to FIG. 1, having determined the coating ratio at step 35 (and in turn, the percentage of the surface area to be covered by the coating composition), subsequent step 55 includes applying the coating composition to the determined percentage of the surface of the optical resonator. Any part of the surface area of the optical resonator can be coated with the coating composition as long as the determined percentage of the surface area is coated.

In step 55, the composition can be applied on the determined percentage of the surface of the optical resonator in any manner known to one of ordinary skill in the art. For example, the composition can be applied by way of brushing, such as, for example, through the use of a wooden mini-brush. Alternatively, various companies, such as NUSIL Technology LLC of Carpinteria, Calif., have technologies for applying compositions to optical resonators.

At this point, the partially coated optical resonator now possesses the desired optical frequency. By coating a determined percentage of the surface of the optical resonator with the chosen coating composition, which inherently possesses a thickness when it is applied onto the surface of the optical resonator, any evanescent field formed in the optical resonator would become permanently distorted. This results in a permanent shift of the optical frequency of the optical resonator to the desired value.

Optionally, the partially-coated optical resonator can then be thermally stabilized by inserting the partially-coated optical resonator into a thermoelectric stabilization system, or the like, to prevent any temperature-related frequency shifts.

Figure 4:
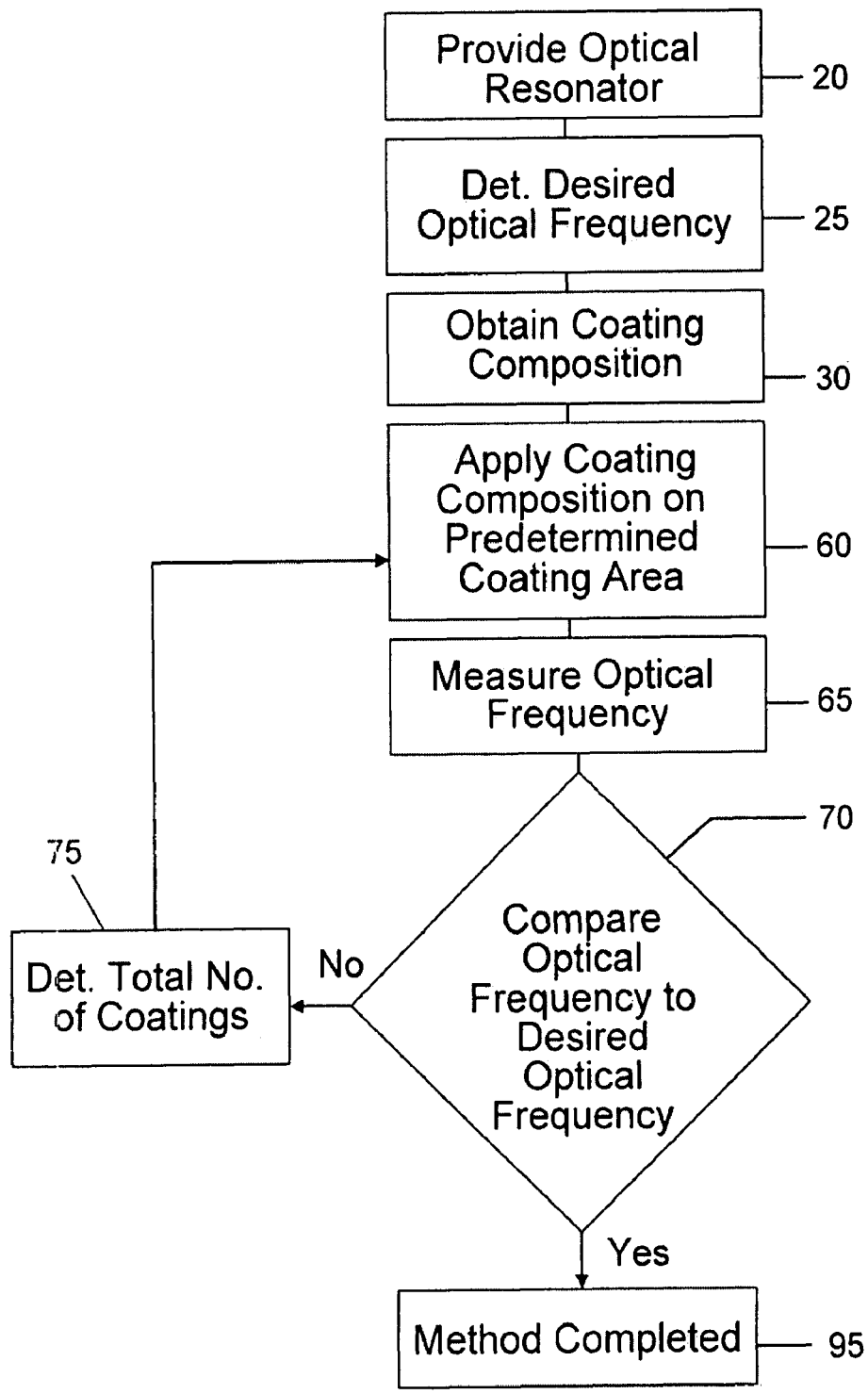
FIG. 4 is a flow diagram of an alternative embodiment of the method of the present teachings.

FIG. 4 shows an alternative embodiment of the method of the present teachings. This alternative embodiment includes the application of one or more coats of a chosen coating composition to a predetermined coating surface area, PN, on the surface of the optical resonator.

Referring to FIG. 4, steps 20, 25, and 30 are identical to steps 20, 25, and 30 of the embodiment shown in FIG. 2. However, new step 60 includes the application of a coating of the chosen coating composition to the entire predetermined coating surface area, PN. At step 65, the optical frequency of the optical resonator is measured. At step 70, the optical frequency of the coated optical resonator is compared to the desired optical frequency. If the optical resonator possesses the desired optical frequency, the method is completed at step 95. However, if the optical resonator does not possess the desired optical frequency, step 60 is repeated by applying additional coatings until the desired optical frequency is measured at step 70. Before applying any additional coatings, step 75 first determines the total number of coatings required for the optical resonator to possess the desired optical frequency. This can be readily calculated, as will be further discussed below, as each subsequent coating results in the same optical frequency shift as is achieved with the application of the first coat.

Figure 5:
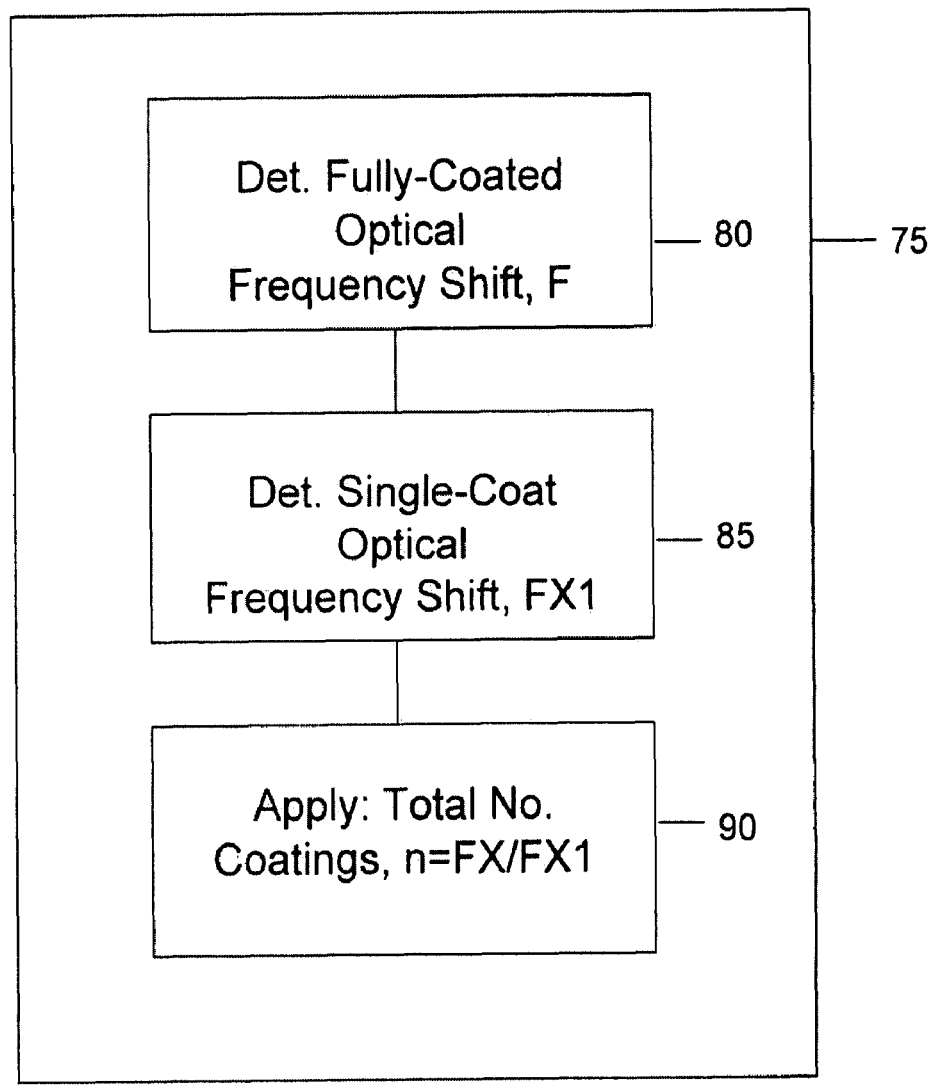
FIG. 5 is a flow diagram showing details of step 75 of the embodiment of the method shown in FIG. 4.

The details of step 75 are shown in FIG. 5. Step 75 encompasses sub-steps 80, 85, and 90. At sub-step 80, the fully-coated optical frequency shift, F, is determined as has been described above with respect to the first embodiment. At sub-step 85, a single-coat optical frequency shift, FX1, is determined based on the fully-coated optical frequency shift, F, and the coating ratio, as discussed below. The single-coat optical frequency shift, FX1, corresponds to the difference between the initial optical frequency of the optical resonator and an optical frequency when the predetermined coating surface area of the optical resonator is coated with a single coat of the coating composition chosen in step 30.

In determining the single-coat optical frequency shift, FX1, a coating ratio value is determined based upon the known value of the predetermined coating surface area. The coating ratio corresponds to a predetermined fraction of the entire surface area of the optical resonator to be coated, and can be determined by using the following equation:

$$\text{coating ratio} = PN/TSA$$

wherein PN is the predetermined coating surface area (or known surface area to be coated) and TSA is the total surface area of the optical resonator which can be determined by any method as would be known to one of ordinary skill in the art.

The single-coat optical frequency shift, FX1, of a single-coated optical resonator can then be determined using the following equation:

$$FX1 = F*(\text{coating ratio})$$

At sub-step 90, the total number of coatings, n, to be applied in order to obtain the desired optical frequency can be determined using the following equation:

$$n = (FX/FX1)$$

Now referring back to FIG. 4, from step 75 the method loops back to step 60 where additional coatings are applied to the optical resonator until the actual number of coatings is equal to the determined total number of coatings, n. At this point, the method could be ended resulting in an optical resonator which has had its optical frequency shifted and permanently fixed to the desired value. Optionally, the method could continue in order to measure and confirm that the optical resonator possesses the desired optical frequency. At step 65, the optical frequency of the multi-coated optical resonator is measured. At step 70, the optical frequency of the multi-coated optical resonator is compared to the desired optical frequency to confirm that it possesses the desired optical frequency. If the multi-coated optical resonator possesses the desired optical frequency, the method is completed at step 95.

Example

A 6 mm diameter $CaF_2$ optical resonator was fabricated in a laboratory. The fabricated optical resonator was then bonded on top of a metal post. The metal post and the bounded optical resonator were then inserted into a three-stage thermoelectric stabilization system. The thermoelectric stabilization system stabilized the surrounding temperature in order to prevent any temperature-related frequency shifts in the optical resonator. The first of the three thermoelectric cooler (TEC) stages stabilized the temperature of the electronic circuits of the thermoelectric stabilization system. The second of the three TEC stages biased the temperature of the optical setup from the temperature of the environment thereby thermally stabilizing the thermoelectric stabilization system. The third TEC stage responded to any high frequency thermal disturbances, e.g., convection or weak wind from an air conditioning system vent. An InGaAs detector DET410 (sold by Thorlabs of Newton, N.J.) was arranged to measure spectral responses of the optical resonator as the coating composition was brushed onto the surface of the optical resonator. Additionally, emission of a laser (sold by Koheras of Birkerød of Denmark) having a wavelength of about 1559 nm was optically coupled to the optical resonator. The laser was turned on and its frequency was swept by piezo having a sweep frequency of from about 20 Hz to about 5 GHz. Ten wooden sticks from cotton tipped applicators (sold by Puritan Medical Products Co. of Guilford, Me.) were snapped. The sharpest and softest tips were selected and used as a "wooden brush" to apply an LS-2233 optical coating composition (sold by NUSIL Technology LLC of Carpinteria, Calif.) on a portion of the surface of the optical resonator.

Figure 6:
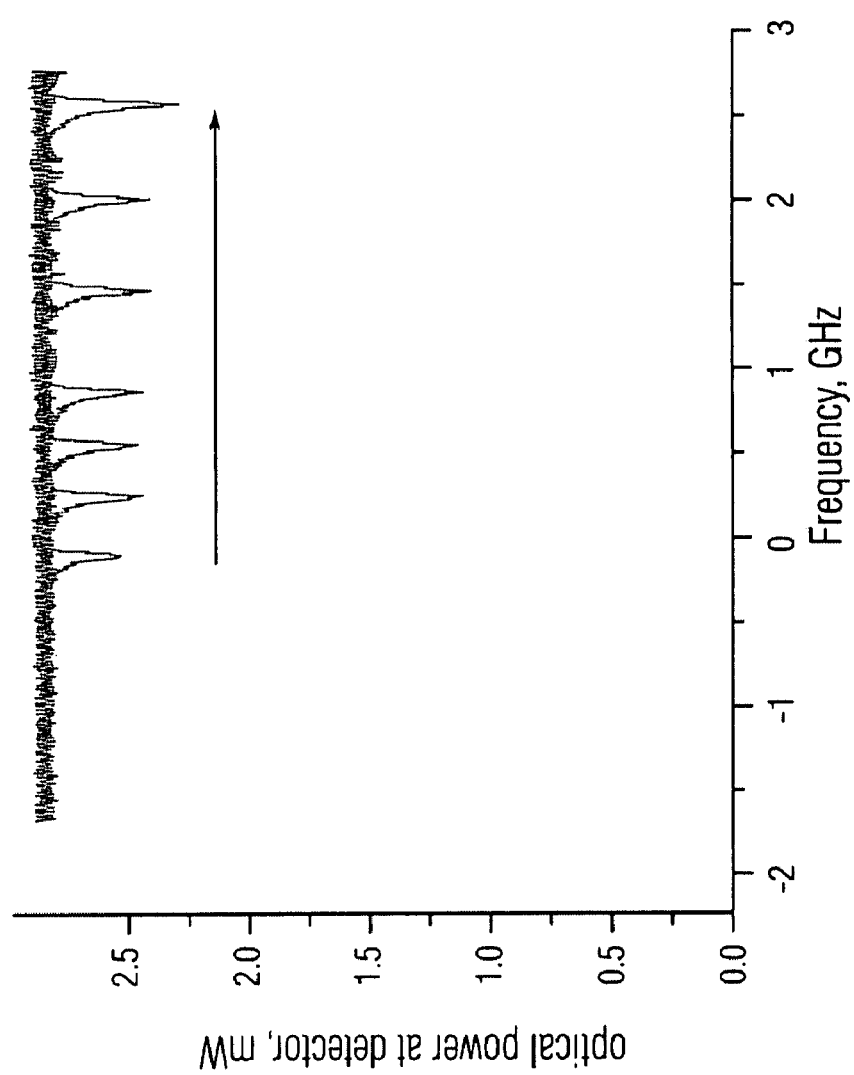
FIG. 6 is a graph showing an optical frequency shift of an optical resonator as a larger portion of the surface of the optical resonator is being coated.

A drop of the LS-2233 optical coating composition was placed in a clean fresh glass micro slide (sold by VWR International of West Chester, Pa.). The concentration of the substance in the optical coating composition was measured and it was determined that the application of the optical coating composition on the optical resonator would create a coating having a thickness of about 350 nm. One of the wooden brushes was dipped into the drop of the optical coating composition. The brush was then used to apply the coating composition on a portion of the surface of the optical resonator. Each application of the coating composition covered approximately 2.8% of the optical resonator. After each application, a spectrum of the optical resonator was measured. The results of the spectra analysis is shown in FIG. 6. As shown, the optical frequency of the optical resonator was shifted only when the coating was applied. The three-stage thermoelectric stabilization system ensured that the optical frequency shift did not occur as a result of thermal drift or mechanical stress.

Those skilled in the art can appreciate, from the foregoing description that the present teachings can be implemented in a variety of forms. Therefore, while these teachings have been described in connection with particular embodiments and examples thereof, the true scope of the present teachings should not be so limited. Various changes and modifications may be made without departing from the scope of the teachings herein.

What is claimed is:

1. A method of shifting and fixing an optical frequency of an optical resonator to a desired optical frequency comprising:

provding an optical resonator having a surface and a refractive index;

determining the desired optical frequency;

obtaining a coating composition having a predetermined concentration of a substance and having a refractive index that is substantially similar to the refractive index of the optical resonator, the coating composition inherently possessing a thickness when applied as a coating;

determining a coating ratio for the surface of the optical resonator; and applying the coating composition onto a portion of the surface of the optical resonator based upon the determined coating ratio.

2. The method of claim 1, wherein determining the coating ratio is dependent upon the desired optical frequency and the obtained coating composition.

3. The method of claim 1, wherein determining the coating ratio comprises determining a fully-coated optical frequency shift, F, of the optical resonator which corresponds to a difference between an initial optical frequency of the optical resonator and an optical frequency when the optical resonator is fully-coated with the obtained coating composition.

4. The method of claim 3, wherein determining the coating ratio comprises determining a desired optical frequency shift, FX, of the optical resonator which corresponds to a difference between the initial optical frequency of the optical resonator and the desired optical frequency of the optical resonator.

5. The method of claim 4, wherein determining the coating ratio of the surface of the optical resonator comprises applying the equation:

$$\text{coating ratio} = FX/F$$

6. The method of claim 1, wherein applying the coating composition on the surface of the optical resonator comprises brushing the coating composition onto the surface of the optical resonator to cover a percentage of the surface of the optical resonator corresponding to the coating ratio.

7. A method of shifting and fixing an optical frequency of an optical resonator to a desired optical frequency comprising:

providing an optical resonator having a surface and a refractive index;

determining the desired optical frequency;

obtaining a coating composition having a predetermined concentration of a substance and a refractive index that is substantially similar to the refractive index of the optical resonator, the coating composition inherently possessing a thickness when applied as a coating; and applying a coating of the coating composition onto a predetermined coating surface area of the optical resonator, measuring the optical frequency of the optical resonator; and comparing the optical frequency to the desired optical frequency and re-applying a number of additional coatings to the predetermined coating surface area until the desired optical frequency is achieved.

8. The method of claim 7, wherein a total number of applied coatings is dependent upon the desired optical frequency and the predetermined coating surface area.

9. The method of claim 7, wherein re-applying additional coatings includes determining the total number of coatings, n, by determining a fully-coated optical frequency shift, F, of the optical resonator which corresponds to a difference between an initial optical frequency of the optical resonator and an optical frequency when the optical resonator is fully coated with the obtained coating composition.

10. The method of claim 9, wherein determining the total number of coatings, n, further comprises determining a single-coat optical frequency shift, FX1, of the optical resonator which corresponds to the difference between the initial optical frequency of the optical resonator and an optical frequency when the predetermined coating surface area of the optical resonator is coated with a single coat of the obtained coating composition.

11. The method of claim 10, wherein determining the single-coat optical frequency shift, FX1, comprises applying the equation:

$$FX1 = F*(PN/TSA)$$

wherein PN is the predetermined coating surface area and TSA is the total surface area of the optical resonator.

12. The method of claim 11, wherein determining the total number of coatings, n, further comprises determining a desired optical frequency shift, FX, of the optical resonator which corresponds to a difference between the initial optical frequency of the optical resonator and the desired optical frequency of the optical resonator.

13. The method of claim 12, wherein determining the total number of coatings, n, further comprises applying the equation: n=(FX/FX1).

14. An optical resonator having a shifted and fixed optical frequency made by the method of claim 1.

15. An optical resonator having a shifted and fixed optical frequency made by the method of claim 7.

* * * * *